United States Patent [19]

Tomori et al.

[11] 4,443,085
[45] Apr. 17, 1984

[54] CAMERA WITH AN INTERCHANGEABLE LENS

[75] Inventors: Yasumasa Tomori, Sakado; Mituhiko Shimoda, Asaka; Keisuke Haraguchi, Ranzan, all of Japan

[73] Assignee: Asahi Kogaku Togyo Kabushiki Kaisha, Tokyo, Japan

[21] Appl. No.: 418,568

[22] Filed: Sep. 15, 1982

Related U.S. Application Data

[63] Continuation of Ser. No. 267,697, May 27, 1981, abandoned.

[30] Foreign Application Priority Data

Jun. 11, 1980 [JP] Japan .................................. 55-78856
Jun. 11, 1980 [JP] Japan .................................. 55-78857

[51] Int. Cl.³ .............................................. G03B 3/10
[52] U.S. Cl. ..................... 354/402; 354/286; 354/195.12
[58] Field of Search ................. 354/25, 46, 195, 286; 352/140

[56] References Cited

U.S. PATENT DOCUMENTS 3,762,295 10/1973 Kitai ................................. 354/286
3,940,777 2/1976 Komine ............................. 352/140
3,972,056 7/1976 Tsujimoto et al. ............. 354/195 X
4,104,650 8/1978 Hosoe et al. ..................... 354/25
4,323,303 4/1982 Enomoto ......................... 354/25

FOREIGN PATENT DOCUMENTS 1032981 6/1966 United Kingdom ............... 354/195

Primary Examiner—John Gonzales
Attorney, Agent, or Firm—Merchant, Gould, Smith, Edell, Welter & Schmidt

[57] ABSTRACT

A camera with an interchangeable lens, comprising a lens barrel having a focussing lens means, and a camera body having a mount to which a mount of the lens barrel is detachably connected and a focus detecting device, the lens barrel comprising a driving motor for moving the focussing lens means, said camera further comprising a control circuit which is provided either on the camera body or on the lens barrel to give a control signal to the driving motor, the camera body and the lens barrel being provided, on their mounts, with connector means for transmitting and receiving the focussing control signals, the connector means being interconnected when the lens barrel is connected to the camera body.

6 Claims, 12 Drawing Figures

CAMERA WITH AN INTERCHANGEABLE LENS

This is a continuation of application Ser. No. 267,697, filed May 27, 1981, now abandoned.

This invention relates to an automatic focussing camera with an interchangeable lens, such as a single-lens reflex camera and particularly to an automatic focussing system camera having a plurality of different type lens barrels and a camera body common to the lens barrels.

In a camera with an interchangeable lens, different lens barrels are used for different interchangeable lenses, such as telephoto, standard or wide angle lenses, and a total displacement of a focussing lens which is moved to adjust the focus of the lens or a displacement of the focussing lens per unit of angular rotation varying in accordance with the kinds of the interchangeable lenses. This variation of the displacement of the focussing lens makes it impossible to provide a drive and control mechanism of the focussing lens means which is common to different interchangeable lenses. Furthermore, it is necessary to operatively connect a lens barrel to a camera body to which the lens barrel is detachably mounted. However, in a conventional camera which has a cable extending between the lens barrel and the camera body to control the focus, the connection and cisconnection of the lens barrel to and from the camera body are followed by the connection and disconnection of the cable. Furthermore, there is a possibility that the cable is damaged or broken by means of an unexpected obstacle when an operator carries the camera or an operator takes a photograph.

The primary object of the present invention is to provide an automatic focussing camera which can automatically adjust the focus for different kinds of interchangeable lenses.

Another object of the present invention is to provide a camera in which the connection of an interchangeable lens to a camera body causes automatic focussing mechanisms or circuits of the interchangeable lens and the camera body to be automatically interconnected.

Still another object of the present invention is to obtain optimum operational characteristics of focussing lens means, for different interchangeable lenses which have different total displacements or different displacements per unit angular rotation of the focussing lens means.

Still another object of the present invention is to make it possible to control driving motors of certain kinds of interchangeable lenses by means of a common control circuit provided on the camera body, without preparing different control circuits for the different interchangeable lenses.

In order to achieve these objects, according to the present invention, there is provided a camera with an interchangeable lens, which comprises a focus detecting device on a camera body, a driving motor on a lens barrel, a focussing optical lens driving mechanism which includes the driving motor and which is provided on the lens barrel, a control circuit which is provided either on the camera body or the lens barrel or on both to give a drive signal to the driving motor in response to the output of the focus detecting device, and means for transmitting and recieving signals to control the focus, provided on a mount for detachably connecting the camera body and the lens barrel, said means being brought into an operational position when the lens barrel is connected to the camera body. In case where the driving motor control circuit is provided on the camera body, the control circuit can be used when an interchangeable lens barrel which has no control circuit is mounted on the camera body. The driving motor control circuit on the lens barrel can be used when the camera body has no control circuit or when it is necessary to drive the focussing optical lenses in a manner different from that of the control circuit in the camera body. An electric power source for the driving motor(s) can be provided on the camera body. However, it is also possible to provide an electric power source on the lens barrel, if necessary, to decrease the power necessary from the power source on the camera body.

The above discussed and other objects, features and advantages of the present invention will become more apparent from the following description thereof, when taken in connection with the accompanying drawings, in which.

Figure 9:
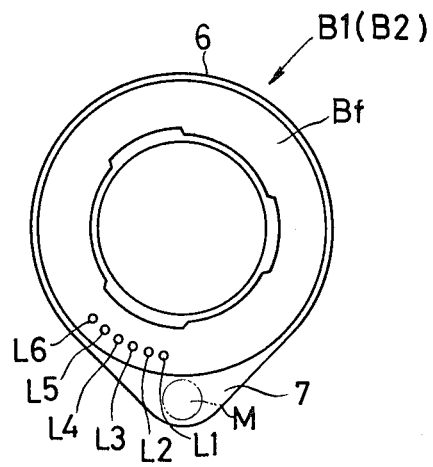
Figure 10:
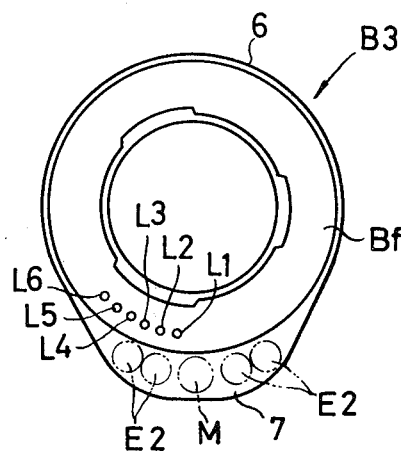
Figure 11A:
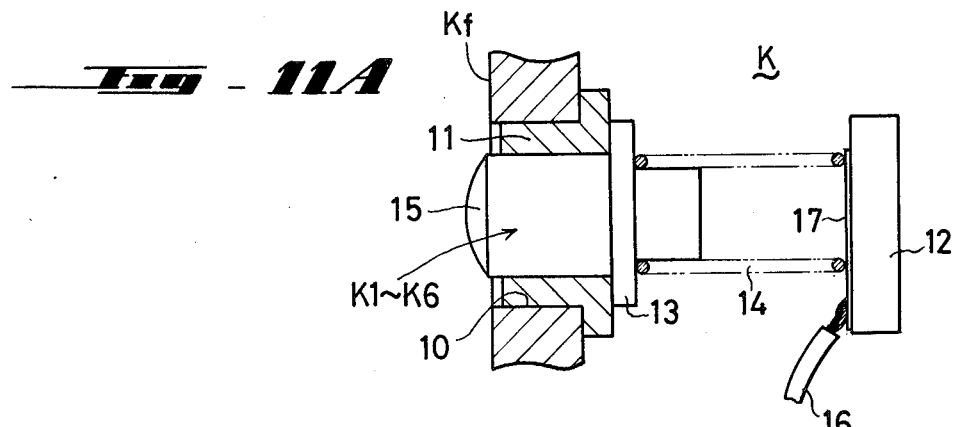
Figure 11B:
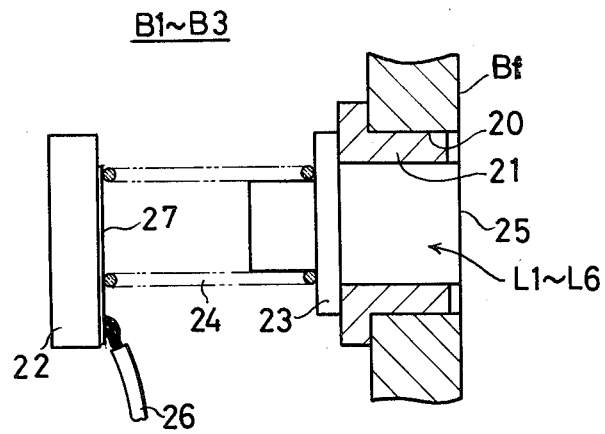
Figure 11B:
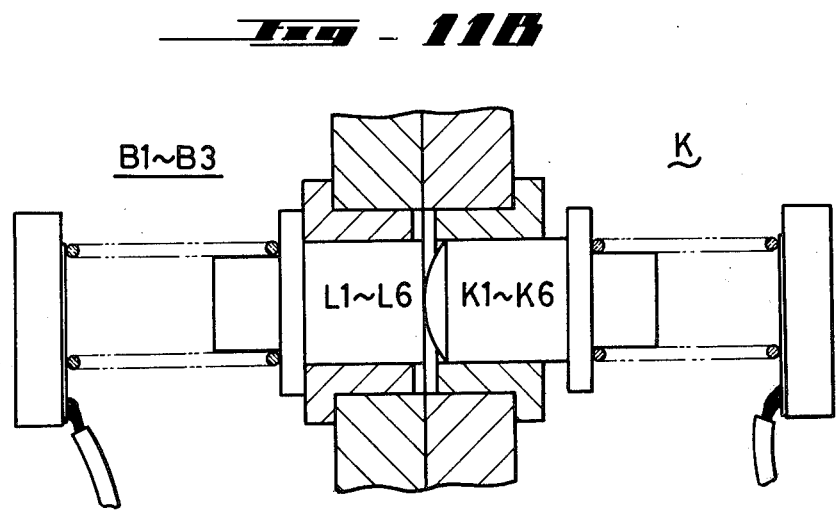

FIGS. 9 and 10 are elevational views of lens barrels in FIGS. 1, 2 and 3, 4, viewed from a mount of camera body, respectively; and FIGS. 11A and 11B are longitudinal sectional views of signal transmitting and recieving terminals provided in the camera body and the lens barrel shown in a disconnected position in which the terminals are disconnected from each other and a connected position in which the terminals are interconnected, respectively.

Figure 1:
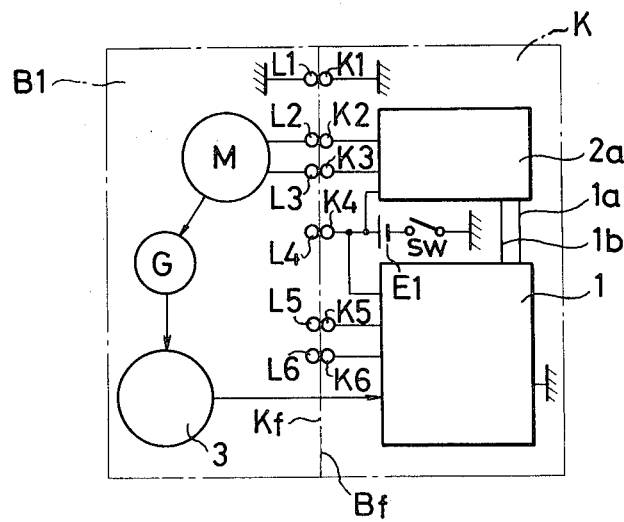
FIGS. 1–3 are schematic views showing connections between a common camera body and different lens barrels, in a camera with an interchangeable lens according to embodiments of the present invention.
Figure 2:
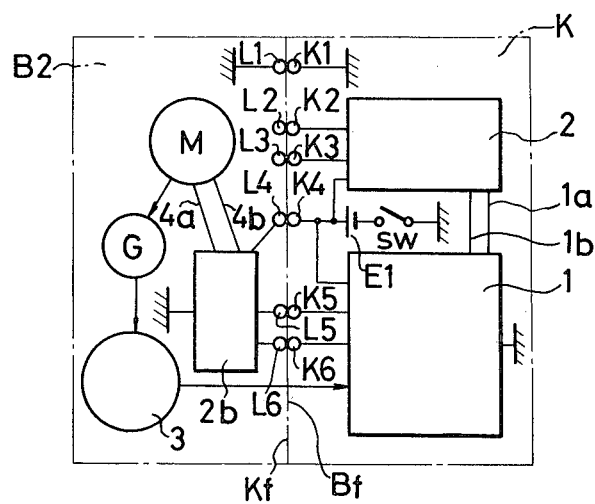
Figure 3:
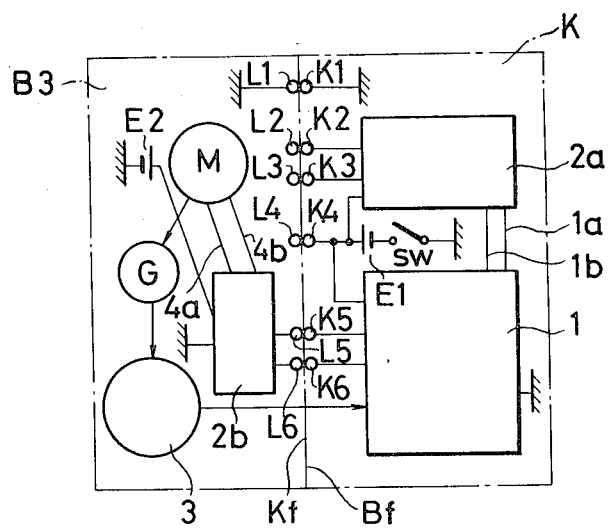

FIGS. 1–3 show connection system of lens barrels B1–B3 to an identical camera body K. Mounts of all the interchangeable lenses are identical so that they can be detachably connected to a mount of the camera body.

The camera body K has therein a focus detecting device (circuit) 1 and a control device 2a. The focus detecting device 1 recieves information of an image which is formed by focussing lens means 3 of the lens barrel to determine whether the focussing lens means 3 should be moved forward or backward to focus an object of a focal plane (film plane) and then it issues a necessary signal in accordance with the determination. The focus detecting device 1 issues a stop signal to stop the movement of the focussing lens means 3 when the object is imaged on the focal plane. The output signal of the focus detecting device 1 is fed to the control circuit 2a by means of leads 1a and 1b connecting the focus detecting device 1 and the control circuit 2a. The control circuit 2a gives a signal for rotating, reversing or stopping a motor M, to rotation indication terminals K2 and K3 of the motor M in response to the output signal of the focus detecting device 1. The focus detecting device 1 which operates as mentioned above is per se known for example, in U.S. Pat. No. 4,045,804, and accordingly the present invention is not directed to such a focus detecting device. The control circuit 2a for the driving motor M is also per se known and can be comprised of, for example, a conventional motor rotating and reversing circuit including a bridge circuit.

The output signal of the focus detecting device 1 is also fed to focus output terminals K5 and K6. The terminals K5 and K6, the terminals K2 and K3, a ground terminal K1 and a power supply terminal K4 are all located on a mount flange surface Kf of the camera body K. The power supply terminal K4 is an external terminal of a series circuit including a power source E1 and a switch SW arranged in the camera body K.

For the identical camera body K, each of the lens barrels B1-B3 comprises the driving motor M, and a driving mechanism G, such as a reduction gear which is moved by the driving motor M to move the focussing lens means 3 forwards or backwards. Each of the lens barrels B1-B3 has receiving terminals L1-L6 which are arranged on a motor flange surface Bf of the lens barrel, corresponding to the terminals K1-K6 of the camera body K and which are connected to the corresponding terminals K1-K6 when the lens barrel is connected to the camera body.

In the lens barrel B1 illustrated in FIG. 1, the rotation indication signal receiving terminals L2 and L3 and the power supply receiving terminals L4 are connected to the motor M. However, the terminals L5 and L6 are idle.

The lens barrel B2 illustrated in FIG. 2 has therein a driving motor control circuit 2b, in addition to components of the lens barrel B1 of FIG. 1. The control circuit 2b is connected to the focus output receiving terminals L5 and L6 so that the output signal of the focus detecting device 1 is fed to the control circuit 2b to give a drive signal to the driving motor M by means of leads 4a and 4b. The power supply receiving terminal L4 is connected not only to the motor M but also to the control circuit 2b. The terminals L2 and L3 in FIG. 2 are idle.

The lens barrel B3 illustrated in FIG. 3 additionally includes both the control circuit 2b and the power supply E2. The power of the power supply E2 is fed to the motor M and the control circuit 2b. Therefore, the terminal L4 also becomes idle, in comparison with the lens barrel B2 in FIG. 2.

The terminal L1 (FIGS. 1-3) is a ground terminal connected to the ground terminal K1.

As can be seen from FIG. 1, when the lens barrel B1 is connected to the camera body K by means of the mounts, the terminals L1-L6 on the lens barrel are connected to the corresponding terminals K1-K6 on the camera body so that a focussing control circuit including a system of the focussing lens means 3→the focus detecting device 1→the control circuit 2a→the driving motor M→the driving mechanism G→the focussing lens means 3 can be formed. The power supply E1 of the camera body K supplies the power to the driving motor M and the focus detecting device 1.

When the switch SW which is actuated, for example, by a release button (not shown) provided on the camera body is made ON to drive the focus detecting device 1, the latter detects the deviation of the image formed by the focussing lens means 3, from the film plane (focal plane). The focus detecting device 1 can also detect the magnitude and the direction of the deviation. After that, the control circuit 2a gives a drive signal to the driving motor M, in response to the detection signal of the focus detecting device 1, to rotate or reverse the motor M. Consequently, the motor M causes the focussing lens means 3 to be moved in a predetermined direction by means of the driving mechanism G so that the object can be exactly imaged on the film plane. Once the focussing is achieved, the focus detecting device 1 gives a stop signal to the driving motor M by means of the control circuit 2a, so that the focussing lens means 3 stops moving. Thus, automatic focussing is completed. A shutter (not shown) is then actuated.

In an arrangement shown in FIG. 2, the control circuit 2a is not used, since the terminal L2 and L3 are idle, i.e, since the terminals L2 and L3 are not connected to the driving motor M, unlike the arrangement in FIG. 1. In FIG. 2, the control circuit 2b provided in the lens barrel B2 is used in place of the control circuit 2a. That is, the control circuit 2b is connected to the focus detecting device 1 by means of the terminals K5, K6 and L5, L6 which are connected to each other. The difference between the arrangements of FIGS. 1 and 2 resides only in that the control circuit 2b is used in FIG. 2, instead of the control circuit 2a. The control circuit 2b may be identical to the control circuit 2a, but preferably has characteristics different from those of the control circuit 2a. The focussing is automatically effected also in the arrangement shown in FIG. 2, in a process similar to the focussing process of the arrangement shown in FIG. 1.

In an arrangement shown in FIG. 3, a focussing control system identical to the focussing control system of the camera shown in FIG. 2 is formed. However, in FIG. 3, it is not the power supply E1 but the power supply E2 that supplies the power to the driving motor M and the control circuit 2b.

The provision of the control circuit 2b of the driving motor M on the lens barrel, as shown in FIGS. 2 and 3, makes is possible to control the focussing operation in a pattern difficult from the control pattern of the control circuit 2a. For example, the control circuit 2a in the camera body K is designed for wide angle lenses which are usually required to be moved by a relatively small displacement to focus the focussing lens means, and different control circuits 2b can be prepared for different telephoto lenses which have different focal lengths and different lens displacements. In general, telephoto lenses are larger and heavier than wide angle lenses, and accordingly, a larger drive power is required to drive the focussing lens means for telephoto lenses. It can be easily understood that the driving motor M and the driving mechanism G are properly designed in accordance with the selection of the lens barrel B1, B2 or B3.

The power supply E2 on the lens barrel contributes to increasing the service life and decreasing the size of the power supply E1 which is provided in the camera body K and which is usually also adapted to control the exposure time of a camera. Furthermore, as the power supply E2, can be used an optimum battery which has a characteristic, for example a good performance characteristic suitable for driving the motor M. The power supplies E1 and E2 may be batteries.

Figure 4:
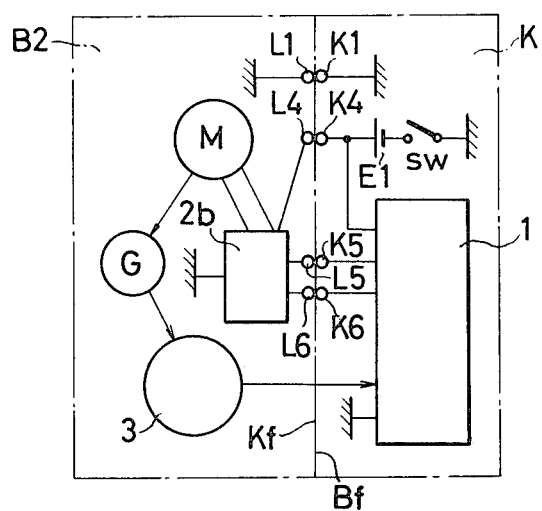
FIGS. 4 and 5 are schematic views showing connections between a common camera body which has no control circuit and different lens barrels in camera systems shown in FIGS. 2 and 3 respectively.
Figure 5:
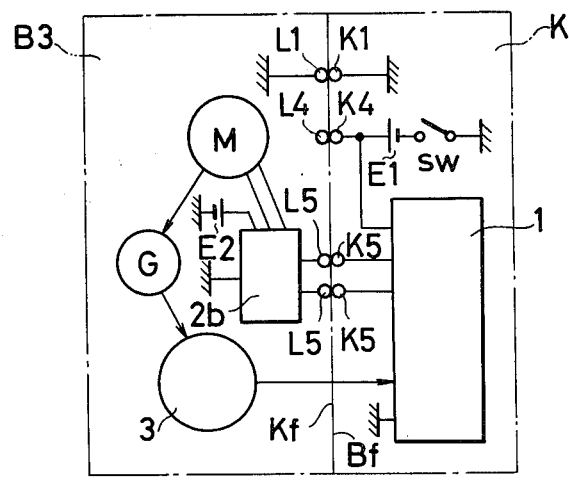

If all of the lens barrels B1-B3 have always therein the control circuit 2b, the control circuit 2a in the camera body K can be dispensed with. This corresponds to an arrangement shown in FIG. 2 or 3 in which the control circuit 2a is removed. Two embodiments of such modified arrangements are illustrated in FIGS. 4 and 5. From these arrangements of FIGS. 4 and 5, the advantage that the different driving motors M for certain kinds of the interchangeable lenses can be controlled by a common control circuit provided in the camera body cannot be expected. However, in the camera systems illustrated in FIGS. 4 and 5, since all of the interchangeable lenses always have the driving motor control circuits 2b, optimum performance characteristics suitable for the different interchangeable lenses can be easily obtained. Furthermore, in comparison with camera systems illustrated in FIGS. 1-3, terminals corresponding to the terminals K2, K3 and L2, L3 are not necessary in FIGS. 4 and 5.

Figure 6:
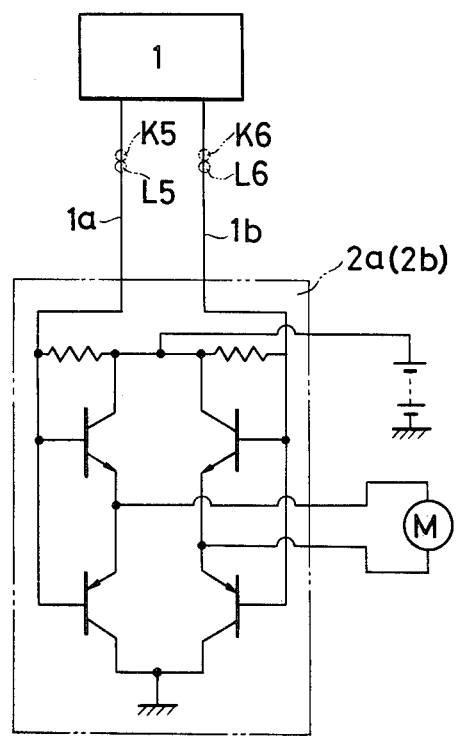
FIG. 6 shows an example of a control circuit.
Figure 7:
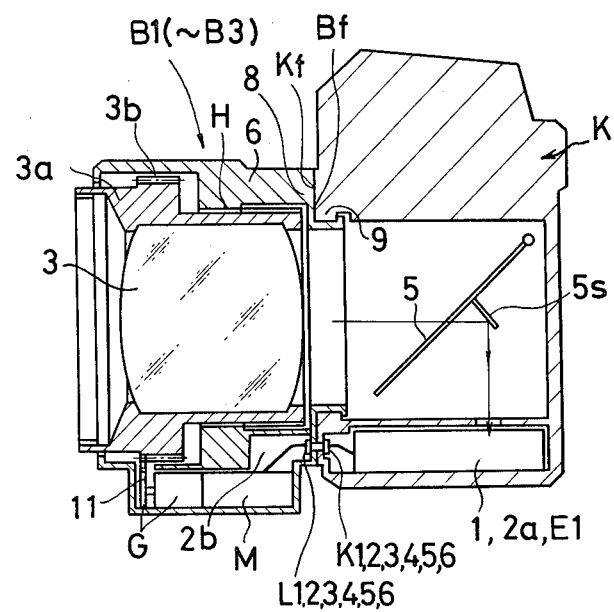
FIG. 7 is a longitudinal sectional views of a camera according to the present invention.
Figure 8:
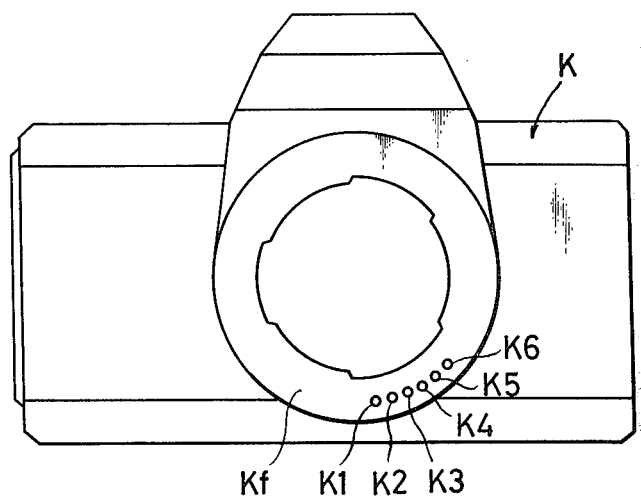
FIG. 8 is an elevational view of a camera body shown in FIG. 7.

FIG. 6 shows an example of the control circuit 2a (or 2b). The control circuit 2a (or 2b) comprises a bridge circuit per se known to drive or reverse the motor M, in accordance with the control signals fed to the bridge circuit from the focus detecting device 1 by means of the leads 1a and 1b (or the terminals K5, L5 and K6, L6).

FIGS. 7-10 show the construction of a camera according to the present invention. In FIGS. 7-10, the elements corresponding to the elements shown in FIGS. 1-6 are designated by the corresponding numerals. The camera body K has therein the focus detecting device 1, the control circuit 2a (if necessary) and the battery E1, at the bottom of the camera body. The focus detecting device 1 receives a reflected light from an auxiliary mirror 5s provided on a half mirror 5. On the flange surface Kf of the mount 9 of the camera body K are located the terminals K1-K6 spaced from one another. The lens barrel B1 (or B2 or B3) has a stationary barrel 6 which is provided therein with a support 3a which holds the focussing lens means 3. The support 3a is supported by a helicoid H formed on the stationary barrel 6, and accordingly, can be moved forwards and backwards in the directions of the optical axis of the camera when it rotates. The stationary barrel 6 has therein the driving motor M and the driving mechanism G, at the bottom of the barrel 6. A gear 11 of the driving mechanism G is engaged by a gear 3b formed on the outer periphery of the support 3a. The control circuit 2b for the driving motor M as shown in FIGS. 2, 3, 4 and 5 can be located, for example, on the driving motor M. The flange surface Bf of the mount 8 of the lens barrel B1 (B2 or B3) is provided thereon with the terminals L1-L6 which are connected to the corresponding terminals K1-K6 of the camera body K when the interchangeable lens barrel is mounted to the camera body.

FIG. 10 shows an example of the location of the power supply E2 consisting of four batteries which are additionally provided in the lens barrel B3, as shown in FIGS. 3 and 5.

FIGS. 11A and 11B show an embodiment of the terminals K1-K6 on the camera body K and the terminals C1-C6 on the lens barrels B1-B3. The terminal K1 (or K2-K6) is slidably fitted in an insulation ring 11 which is located in a hole 10 formed in the mount flange surface Kf of the camera body K. The terminal K1 (K2-K6) has a round front end 15 and a projecting flange 13, and is biased by a compression spring 14 arranged between a stationary base 12 provided in the camera body and the flange 13 of the terminal, so that the front end 15 projects outwards from the hole 10. The compression spring 14 bears against a land portion 17 provided on the stationary base 12. To the land portion 17 is electrically connected a lead 16. The land portion 17, the compression spring 14, and the terminals K1-K6 are all made of a conductive material, and, accordingly, the terminals K1-K6 are always electrically connected to the leads 16.

The terminal C1 (or C2-C6) on the lens barrel B1 (or B2 or B3) is slidably fitted in an insulation ring 21 which is located in a hole 2o formed in the mount flange surface Bf of the lens barrel. The terminal C1 (C2-C6) has a flange 23 and is biased by a compression spring 24 arranged between a stationary base 22 and the flange 23. The compression spring 24 bears against a land portion 27 of the stationary base 22, to which a lead 26 is electrically connected. The terminal has a flat rear end 25 which is substantially flush with the flange surface Bf, unlike the round end 15 of the terminal (K1-K6). When the lens barrels B1-B3 are mounted to the camera body K, the round end 15 comes into contact with the flat end 25, as shown in FIG. 11B, so that the terminals C1-C6 are electrically connected to the corresponding terminals K1-K6 to provide the circuit illustrated in FIGS. 1-5.

As can be understood from the above discussion, when the driving motor M rotates to rotate the support 3a, having the peripheral gear 3b through the driving mechanism G which has the gear 11 engaged by the gear 3b, the support 3a and accordingly the focussing lens means 3 held by the support 3a, are moved forwards and backwards in the optical axis direction, since the support 3a is screw-engaged by the stationary barrel 6 by means of the helicoid H. The focussing operation can be effected by the focussing control systems, as shown in FIGS. 1-5.

Whether or not the lens barrel should include therein the control circuit 2b and/or the power supply E2 suitable for the lens barrel can be determined in accordance with characteristics of the lenses, and particularly performance characteristics of the focussing lens means 3, characteristics of the driving motor M, and the shape and weight of the lens barrel to be used. The location of the control circuit 2b and/or the power supply E2 varies in accordance with the interchangeable lenses used. For example, the batteries E2 in FIG. 10 are located in an expanded housing portion 7 provided on the lens barrel B3. However, in case of telephoto lenses, a space for receiving optical systems is necessarily provided in the lens barrel, and, accordingly, the control circuit 2b and/or the power supply E2 may be located in that space. In such a case, the expanded housing porting 7 can be dispensed with.

In the illustrated embodiments, the lens barrels other than the lens barrels illustrated in FIGS. 4 and 5, have the terminals L1-L6 for the purpose of a common use of the mount 8 of the lens barrels, even when some of the terminals are not used. However, it is also possible to remove the terminals, such as the terminals L5 and L6 in FIG. 1 which are idle.

Although the above discussion has been directed to automatic focussing, the present camera system is also applicable to manual focussing in which the support 3a can be manually rotated similarly to conventional lens barrels.

According to the present invention, since the terminals for transmitting and receiving the focussing control signals are located on the flange surfaces of the mounts of the camers body K and the interchangeable lens barrel B1 (B2 or B3), the terminals can be easily and rapidly connected to the corresponding terminals to form a focussing control circuit, when the lens barrel is connected to the camera body. Alternatively, it is also possible to put the terminals on mating surfaces of the mounts of the camera body and the lens barrel, other than the flange surfaces. The "mount" referred to herein include not only existing mounts in a conventional camera but also mount surfaces which are specially provided on the camera body and the lens barrel to put the terminals which are means for transmitting and receiving the focussing control signals, on the mount surfaces.

The invention has been described in detail with particular reference to preferred embodiments thereof, but it will be understood that variations and modifications can be effected without changing the basic scope of the invention as described herein above.

We claim:

1. In a camera system with a camera body and a plurality of interchangeable lens barrels, the camera body having a lens mount and a focus detecting device for detecting when the sharpest image is formed on a film plane therein, each lens having focusing means for imaging an object on the film plane, a focusing motor connected to movable elements in each lens barrel, the improvement comprising:

a control circuit inside said camera body connected to the output of said focus detecting device and having an output for directly driving and controlling said focusing motor;

electrical terminals on said camera body mount, a first set of terminals connected to the output of said focus detecting device and a second set of terminals connected to the output of said control circuit within said camera body;

electrical contacts on each lens barrel, at least one lens barrel of a first type having contacts located to mate with said first set of terminals on said body mount, said first type of lens barrel including a control circuit inside the lens barrel for interpreting the output of said focus detecting means and producing an output which drives and controls the focusing motor of the lens barrel so that the focusing of the lens barrel is controlled by circuitry in the lens in response to said focus detecting means;

at least one lens barrel of a second type having contacts located to mate with said second set of terminals on said body and connected to the focusing motor, so that only the control circuit within the camera body focuses the lens barrel directly.

2. A camera system according to claim 1 wherein said first and second type lens barrels have different focusing displacements and wherein said control circuit within said first type lens barrel is electrically matched to the displacement of that lens barrel to provide optimum performance.

3. A camera system according to claim 2 wherein the camera body includes a power supply and a third set of terminals located on said mount and connected to said supply, wherein one of said two types of lens barrels includes contacts on its mount connected to all circuits contained therein to mate with said third terminals to provide operating power and wherein the other of said two types of barrels includes a self-contained power supply for operating all circuits contained in that lens.

4. A camera system according to claim 2 or 3 wherein said terminals and contacts are spaced concentrically around the mounts of the body and the lens barrel.

5. A camera system according to claim 4 wherein said control circuit is a bridge circuit which produces a signal to the focusing motor to rotate, reverse or stop.

6. A camera system according to claim 2 wherein each of said contacts includes a stem sized to pass through the aperture in the lens barrel, said stem extending out of said barrel and having a stop flange affixed to the other end thereof, electrically conductive means for biasing said stem out of said barrel so that said stop flange is normally biased against said barrel, means for connecting said bias means to said focusing motor within said second type of lens barrel, and wherein each of said terminals include a second stem sized to pass through an aperture in the camera body, said stem being rounded at its outward end and having a stop flange connected to the other end thereof, electrically conductive means for biasing said stem such that said stop means is normally biased against the camera body, means for connecting said bias means to said focus detecting device;

said first and second stems being located to automatically mate electrical contact when said lens barrel is mounted on said camera body.

* * * * *

UNITED STATES PATENT AND TRADEMARK OFFICE
CERTIFICATE OF CORRECTION

PATENT NO. : 4,443,085
DATED : 17 April 1984
INVENTOR(S) : Yasumasa Tomori, Mituhiko Shimoda, and Keisuke Haraguchi It is certified that error appears in the above-identified patent and that said Letters Patent is hereby corrected as shown below:

First page, Assignee Name, "Togyo" should be --Kogyo--;

Column 1, line 27, "cisconnection" should be --disconnection--;

Column 1, line 64, "recieving" should be --receiving--;

Column 2, line 29, "views" should be --view--;

Column 2, line 37, "recieving" should be --receiving--;

Column 2, line 48, "recieves" should be --receives--;

Column 4, line 9, "terminal" should be --terminals--;

Column 4, line 34, "is" should be --it--;

Column 4, line 35, "difficult" should be --different--;

Column 6, line 59, "camers" should be --camera--;

Column 6, line 67, "include" should be --includes--; and

Column 7, line 7, "uariations" should be --variations--.

Signed and Sealed this

Sixth Day of November 1984

[SEAL]

Attest:

Attesting Officer

GERALD J. MOSSINGHOFF

Commissioner of Patents and Trademarks